United States Patent
Ohta et al.

[19]

[11] Patent Number: 6,108,297
[45] Date of Patent: *Aug. 22, 2000

[54] OPTICAL DISK WITH A UNIFORM FILM THICKNESS BY HAVING DIFFERENT ANGLES OF INCLINATION FOR THE SIDE SURFACES OF GROOVES

[75] Inventors: Teruyuki Ohta, Yachiyo; Masahiro Furuta, Tokyo, both of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/154,722

[22] Filed: Sep. 17, 1998

[30] Foreign Application Priority Data

Sep. 17, 1997 [JP] Japan ..................................... 9-252139

[51] Int. Cl.⁷ ...................................................... G11B 7/24
[52] U.S. Cl. ..................................... 369/275.4; 369/275.1
[58] Field of Search ............................. 369/275.4, 275.5, 369/275.1, 275.3, 13, 100, 109, 288, 112, 110, 286, 44.26, 277, 273, 284

[56] References Cited

U.S. PATENT DOCUMENTS

| | | | |
|---|---|---|---|
| 5,504,734 | 4/1996 | Morita | 369/275.4 |
| 5,517,486 | 5/1996 | Haneda | 369/280 |
| 5,708,651 | 1/1998 | Sugaya et al. | 369/275.4 |
| 5,799,007 | 8/1998 | Lee et al. | 369/275.4 |
| 5,883,879 | 3/1999 | Fukuoka et al. | 369/275.4 |
| 5,946,288 | 8/1999 | Ogawa | 369/275.4 |

Primary Examiner—Ali Neyzari

[57] ABSTRACT

An optical disk including a substrate having a circular shape and a recording film on which information is recorded formed on the substrate. The substrate includes grooves formed in a concentric circular shape or spiral shape, the grooves including a first groove having a specific radially positioned circumference on the substrate, second grooves formed circumferentially inside the first groove, and third grooves formed circumferentially outside the first groove. At least an outer circumferential side surface of the second grooves have a taper with an angle of inclination of the outer circumferential side surface being smaller than the angle of inclination of an inner circumferential side surface of the second grooves. At least an inner circumferential side surface of the third grooves have a taper with an angle of inclination of the inner circumferential side surface being smaller than an angle of inclination of an outer circumferential side surface of the third grooves, and the recording film covers the grooves. The optical disk provides land portions and groove portions having equal film thickness of the recording film.

8 Claims, 5 Drawing Sheets

OPTICAL DISK WITH A UNIFORM FILM THICKNESS BY HAVING DIFFERENT ANGLES OF INCLINATION FOR THE SIDE SURFACES OF GROOVES

CROSS-REFERENCE TO RELATED APPLICATIONS

This application is based upon and claims priority of Japanese Patent Application No. 09-252139 filed Sep. 17, 1997, the contents being incorporated herein by reference.

BACKGROUND OF THE INVENTION

1. Field of the Invention

The present invention relates to a rewriteable optical disk and a method of manufacturing the rewriteable optical disk. More particularly, the present invention relates to a rewriteable optical disk, and method of manufacturing the optical disk, which provides a recording film having uniform film thickness in a land portion and in a groove portion.

2. Description of the Related Art

Recently, there has been a demand for rewriteable optical disks having higher recording density to provide an optical disk having increased capacity. The land/groove recording method has been proposed to increase the recording density of the rewriteable optical disk. In the conventional land/groove recording method, information is recorded on the optical disk in both a bottom portion (groove portion) of grooves formed in concentric circles in the optical disk, and in a portion between adjacent grooves (land portion).

More particularly, in the land/groove recording method, the track pitch (which corresponds to the pitch between an adjacent land portion and groove portion) is about half of the track pitch produced by the method of recording on only the lands or on only the grooves, thereby increasing the recording density (track density) in the track width direction.

However, in optical disks using the land/groove recording method, for example, heat occurs when light is irradiated on the land portions during the recording of information on the land portions or during erasure of information recorded on the land portions. The heat which occurs when light is irradiated on the land portions is transmitted to the adjacent groove portions, and information recorded on the groove portion is partially erased (referred to hereinbelow as cross-erasure) as a result of the temperature rise at this time.

Japanese Laid-Open Patent Applications Nos. JP-A-9-161321 and JP-A-9-251674 disclose a disk which solves the problem of cross-erasure by making the transmission of heat between the land portion and the groove portion difficult. In an optical disk produced by the land/groove recording method, the transmission of heat between the land portion and groove portion is made difficult by making the difference in level between adjacent land portions and groove portions large, thus making the groove depth deep, and by making the distance between the land portions and groove portions large.

However, because the groove depth is made deep to avoid cross-erasure in the known optical disk using the land/groove recording method, problems such as the following occur during film formation of a recording film.

A magnetron sputtering method is generally used to perform the film formation of the recording film on the substrate of an optical disk. As shown in FIG. 5, in the magnetron sputtering method, particles 3 fly from a target 4 according to a cosine law in a direction along a line L4 normal to the target 4, as shown by the direction of the arrow 31, and in various directions at inclinations from the normal line L4, as shown by the directions of the arrows 32, 33, 34 and 35.

Among the particles 3 which fly from the target 4, the particles 3 which fly in the direction along the line L4 normal to the target 4 in the direction of the arrow 31 are incident about perpendicularly on the substrate 1, and can reach the land portions 2c and groove portions 2d of the groove 2 in the same way.

On the other hand, the particles 3 which fly out in the directions of arrows 32, 33, 34, 35, inclined from the normal line L4 of the target 4, are incident at an inclination to the substrate 1, and adhere to the sidewalls 2a, 2b of the grooves 2 and, screened by the land portions 2c, adhere to the land portions 2c but do not reach the groove portions 2d. Among the particles 3 which fly out at an inclination to the substrate 1 in the directions of the arrows 32, 33, 34, 35, the proportion of particles actually reaching the groove portion 2d becomes lower, the deeper the depth D of the grooves 2 (deep groove optical disk).

In the above-described manner, in a deep groove optical disk, the proportion of the particles 3 adhering to the groove portion 2d is markedly low. As a result, the recording film becomes thick at the land portions 2c, and becomes thin at the groove portions 2d, and the difference in film thickness between the land portions 2c and groove portions 2d of film which has been formed becomes markedly large. However, the laser power required when performing land/groove recording on an optical disk differs according to the film thickness of the recording film.

Optimum recording of information cannot be performed with an optical disk having a thick film thickness of the land portions 2c, and a thin film thickness of the groove portions 2d, as described above, if the laser power when recording is performed on the land portions 2c or the groove portions 2d is suitable for a different portion. More particularly, if the laser power is at a value which is suitable for recording or erasure of information on the groove portion 2d, the laser power is insufficient in the land portions 2c to the extent that the film thickness is thick, and optimum recording or erasure of information cannot be performed. Moreover, if the laser power when performing recording on land portions 2c and groove portions 2d is set at a value which is suitable for recording or erasure of information at the land portions 2c, the laser power in the groove portions 2d is excessive to the extent that the film thickness is thin, and optimum recording or erasure of information cannot be performed.

Accordingly, for the conventional optical disk described above, when the land portions 2c of the recording film are thick and the groove portions 2d of the recording film are thin, the laser power to perform recording or erasure of information in the land portions 2c has to be at a value different from the laser power to perform recording or erasure of information in the groove portions 2d. When the groove portions 2d of the recording film are thin in comparison with the land portions 2c, the laser power to perform recording or erasure of information in the groove portions 2d is set to a lower value than for the land portions 2c. In the above manner, when different values of the laser power are set to perform recording or erasure of information in the land portions 2c and groove portions 2d, the structure and operation of the recording and playback device becomes complicated.

Furthermore, when using a recording and playback device having the complicated structure and operation, even when the recording or erasure of information in the land portions 2c and the groove portions 2d is performed at different laser powers, a problem occurs in that the information in the groove portions 2d becomes partially erased. More particularly, the information in the groove portions 2d becomes partially erased because the heat generated by the light having high power irradiated when recording or erasing the information in the land portions 2c becomes transmitted to the groove portions 2d, in spite of the groove 2 having been deepened Further, because the groove portion 2d having thin film thickness has a small thermal capacity, the groove portion 2d quickly reaches a high temperature.

Accordingly, cross-erasure in the groove portion 2d of an optical disk using the conventional land/groove recording method is not avoided, even through the depth of the groove 2 is increased to avoid cross-erasure in the conventional land/groove recording method, because the film thickness of the land portion 2c is thick and the film thickness of the groove portion 2d is thin.

SUMMARY OF THE INVENTION

It is an object of the present invention to overcome the problems of the conventional optical disk using the land/groove recording method, and to provide an optical disk having deep L5 grooves which reliably avoids cross-erasure, and decreases the difference between the film thickness of the land portions and the film thickness of the groove portions.

It is another object of the present invention to provide a method of manufacturing an optical disk having deep grooves which reliably avoids cross-erasure, and decreases the difference between the film thickness of the land portions and the film thickness of the groove portions.

Objects and advantages of the present invention are achieved in accordance with embodiments of the present invention with an optical disk, comprising a substrate having a circular shape; a recording film on which information is recorded formed on the substrate, wherein the substrate includes a groove formed in a concentric circular shape or a spiral shape, at least one side surface of the groove having a taper, with an angle of inclination of the at least one side surface being smaller than an angle of inclination of an opposite side surface of the groove, and the recording film covers the groove.

Objects and advantages of the present invention are achieved in accordance with embodiments of the present invention with an optical disk, comprising a substrate having a circular shape; a recording film on which information is recorded formed on the substrate, wherein the substrate includes grooves formed in a concentric circular shape or spiral shape, the grooves including a first groove having a specific radially positioned circumference on the substrate, second grooves formed circumferentially inside the first groove, at least an outer circumferential side surface of the second grooves having a taper with an angle of inclination of the outer circumferential side surface being smaller than the angle of inclination of an inner circumferential side surface of the second grooves, and third grooves formed circumferentially outside the first groove, at least an inner circumferential side surface of the third grooves having a taper with an angle of inclination of the inner circumferential side surface being smaller than an angle of inclination of an outer circumferential side surface of the third grooves, and the recording film covers the groove.

In accordance with embodiments of the present invention, the outer circumferential side surface of the second grooves has an angle of inclination in a range greater than 45° and less than 80°, and the inner circumferential side surface of the third grooves has an angle of inclination in a range greater than 45° and smaller than 80°.

In accordance with the embodiments of present invention, the information is recorded on the optical disk using a land/groove recording method.

In accordance with embodiments of the present invention, the groove depth is preferably 80 nm–600 nm.

In accordance with embodiments of the present invention, the recording film comprises a magnetic element.

In accordance with embodiments of the present invention, the magnetic element is an alloy comprising rare earth metal(s) and transition metal(s).

In accordance with embodiments of the present invention, the recording film comprises a phase change medium.

In accordance with embodiments of the present invention, a method of manufacturing an optical disk comprises, effecting film formation of a recording film on a substrate having a groove formed in a concentric circular shape or spiral shape using a magnetron sputtering method with a target; and setting a radius of an erosion region of the target to coincide with a radius of a specific circumference of the substrate.

In accordance with embodiments of the present invention, because the optical disk includes a groove formed in the substrate having a taper on at least one side surface during film formation of the recording film, particles flying in an oblique direction from a sputtering target are not screened by the land portions of the grooves, and can reach the groove portion incident along the taper of one side surface. Accordingly, the film thickness of the recording film is equal on both the land portion and the groove portion of the groove.

Moreover, because the angle of inclination of one side surface is greater than the angle of inclination of an opposite side surface, the track density can be increased while making the film thickness of the land portions and the groove portions equal.

In accordance with embodiments of the present invention, at least the outer circumferential side surface of the grooves formed circumferentially inside the groove having the specific circumference are given a taper. Accordingly, during film formation of the recording film, among the particles flying out from the erosion region of the target being sputtered, particles flying out in an inclined direction in the inside of the erosion region from the line normal to the target are not screened by the land portions of grooves formed on the inside of the groove of the specific circumference, incident along the taper of the side surface of the outer circumferential side, can reach the groove portions. Accordingly, the thickness of the recording film in the land portions and groove portions of grooves formed inside the groove having the specific circumference are equal.

In accordance with embodiments of the present invention, particles flying out from the target in an inclined direction outside the erosion region from the normal line of the target, and not screened by the land portions of grooves formed outside of the grooves of the specific circumference, incident along the taper of the inner surface of the inner circumferential side, can reach the groove portions. Accordingly, the film thickness of the recording film is equal in the land portions and groove portions of a groove which has been formed outside of this.

In accordance with embodiments of the present invention, the angle of inclination of the inner circumferential side surface of a groove formed circumferentially outside of the groove having the specific circumference is made greater than the angle of inclination of the outer circumferential side surface. Further, the angle of inclination of the outer circumferential side surface of the groove formed circumferentially inside of the groove having the specific circumference is greater than the angle of inclination of the inner circumferential side surface. Accordingly, the film thickness of the recording film of the land portions and groove portions are made equal, and track density can be increased.

In accordance with embodiments of the present invention, the outer circumferential side surface of the groove formed circumferentially inside the groove having the specific radius has an angle of inclination greater than 45° and smaller than 80°. Accordingly, particles flying out in a direction inclined to the inside of the erosion region from the normal line of the target can effectively reach the groove portions without being screened by the land portions of the grooves. Accordingly, the film thicknesses of the recording film in the land portions and groove portions of grooves formed inside the specific radius are equal.

In accordance with embodiments of the present invention, the inner circumferential side surface of the groove formed circumferentially outside the specific radius has an angle of inclination greater than 45° and smaller than 80°. Accordingly, particles which fly out from an inclined direction to the outside of the erosion region from the normal line of the target are not screened by the land portions of the grooves, and can reach the groove portions with good efficiency. Accordingly, the film thickness of the recording film in the land portions and groove portions formed outside the specific radius are equal.

In accordance with embodiments of the present invention, because an optical disk having a film thickness of the recording film which is equal in the land portions and groove portions is used as a medium of the land/groove recording method, in the land portions and groove portions, information can be recorded at the same laser power.

In accordance with embodiments of the present invention, the depth of the grooves is 80 nm–600 nm, when heat transmission between the land portions and the groove portions is difficult, making the film thickness of the recording film constant can reliably avoid crosserasure.

In accordance with embodiments of the present invention, when the recording film comprises an alloy of rare earth metal and transition metal, when thermal stability and heat transmission are high, cross-erasure can be avoided, and an optical disk having a higher density of information can be designed.

In accordance with embodiments of the present invention, when the recording layer comprises a phase change medium, cross-erasure can be avoided, and an optical disk having a higher density of information can be designed.

In accordance with embodiments of the present invention, the erosion region of the target is coincident with the substrate at the diameter of a specific circumference of the optical disk substrate. Accordingly, among particles which fly out in an inclined direction from the sputtered erosion region, particles which fly out in an inclined direction within the erosion region from a normal line of the target are not screened by land grooves of the grooves inside the specific circumference of the substrate, are incident along the taper of the inside surface on the outer circumferential side, and can reach the groove portion. Accordingly, the film thickness of the recording film in land portions and groove portions of grooves which have been formed inside of the specific circumference can be practically equal.

Moreover, particles which fly out in an inclined direction on the outside of the erosion region from the normal line of the target, are not screened by the land portions of grooves outside the specific circumference of the substrate, and are incident along the taper of the inside of the inner circumferential side, and can reach the groove portions. Accordingly, the film thickness of the recording film can be equal in land portions and groove portions of the grooves which have been formed in its outside.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
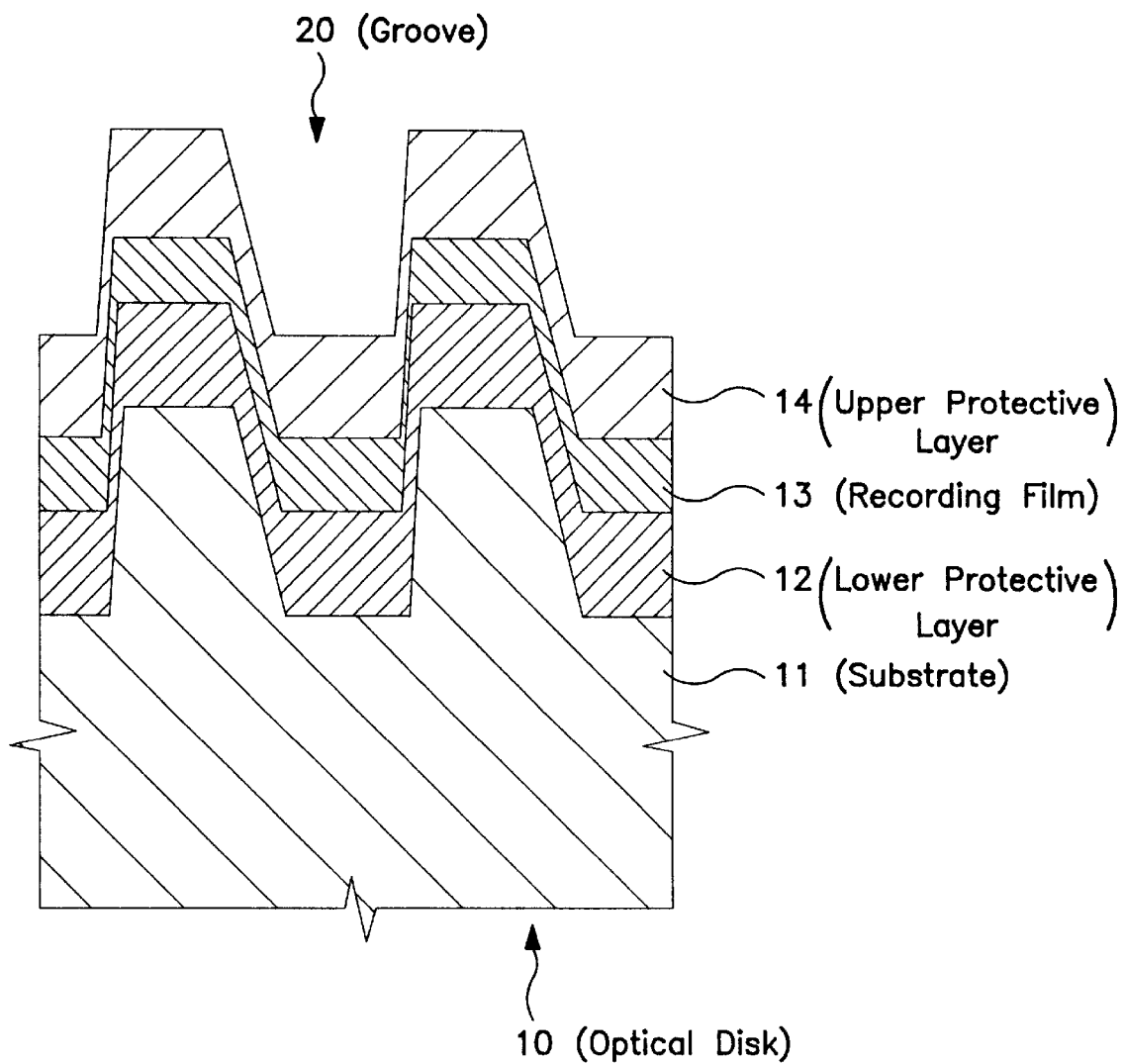
FIG. 1 is a cross-sectional diagram of an optical disk in accordance with embodiments of the present invention.

Reference will now be made in detail to the preferred embodiments of the present invention, examples of which are illustrated in the accompanying drawings, wherein like reference numerals refer to like elements throughout.

FIG. 1 illustrates an optical disk 10 in accordance with a preferred embodiment of the present invention. As shown in FIG. 1, the optical disk 10 comprises a substrate 11, a recording film 13 which records information formed to cover a groove 20 formed in the substrate 11, the recording film 13 being protected by a lower protective layer 12 and an upper protective layer 14.

Figure 2:
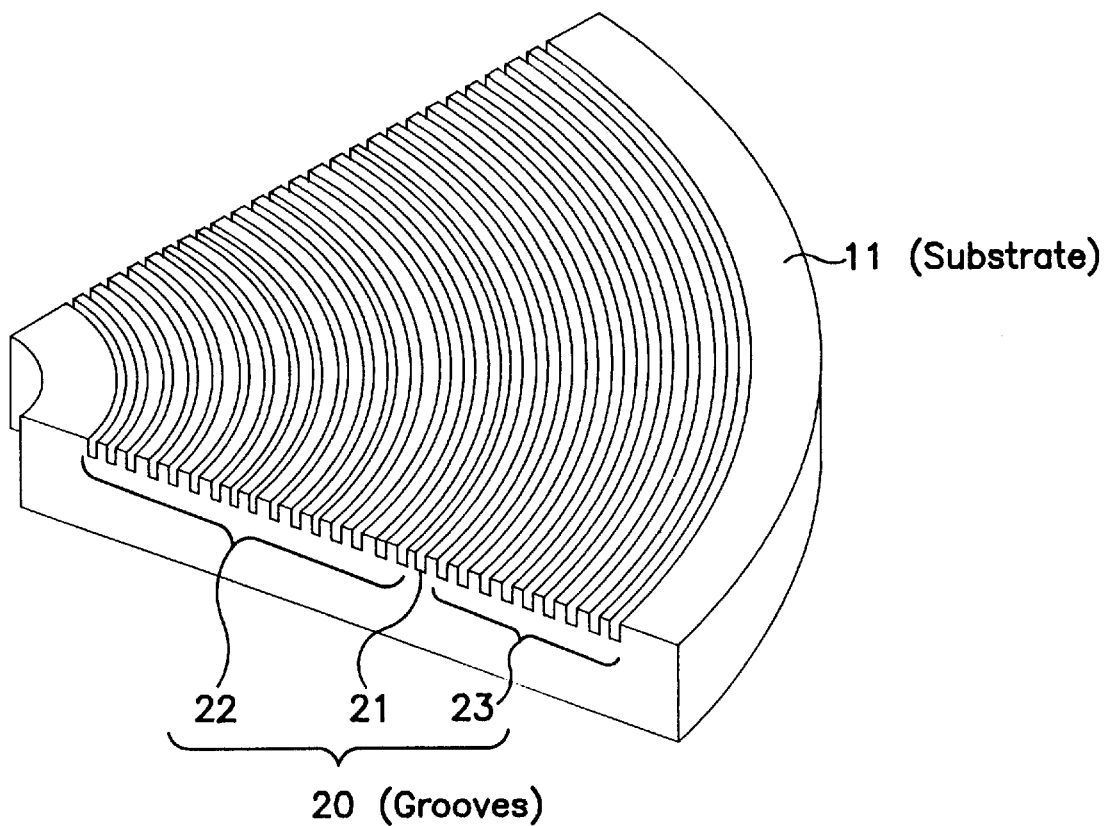
FIG. 2 is an oblique diagram of a substrate of the optical disk in accordance with the first embodiment of the present invention.

The substrate 11 in which the groove 20 is formed will now be described below with reference to FIGS. 2 and 3. As shown in FIG. 2, the substrate 11 is a circular polycarbonate disk, preferably having a diameter of 86 mm. The grooves 20 are formed in concentric circles on one surface of the substrate 11. A groove 21 having a specific circumference, and preferably at a diameter of 75 mm, serves as a boundary separating grooves 22 formed in a circumferential direction inside the groove 21 and grooves 23 formed in a circumferential direction outside the groove 21. The grooves 22 differ in cross-sectional form from the grooves 23.

Figure 3:
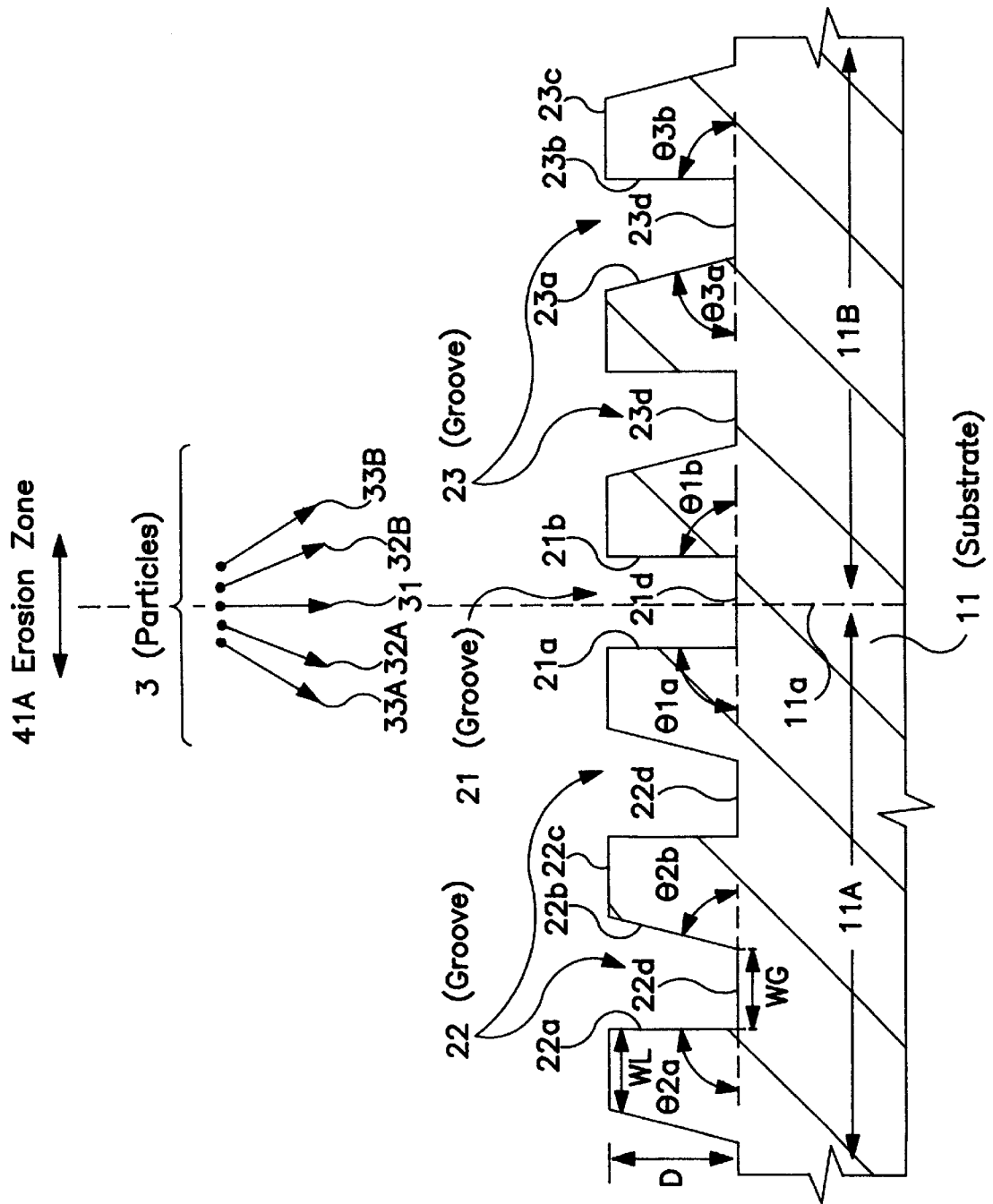
FIG. 3 is an enlarged cross-sectional diagram of the substrate of the optical disk in accordance with embodiments of the present invention.

FIG. 3 is a cross-sectional diagram of the optical disk showing in detail the grooves 21–23 in accordance with the present invention. As shown in FIG. 3, the grooves 22 are formed inside the groove 21 having a specific circumference toward the left-hand side in FIG. 3. The grooves 22 include two side surfaces 22a, 22b. An outer circumferential side surface 22b of the grooves 22 is tapered having an angle of inclination $\Theta 2b$ which is preferably 70°. Moreover, an inner circumferential side surface 22a of the grooves 22 is tapered having an angle of inclination $\Theta 2a$ which is preferably 85°.

Moreover, the grooves 23 are formed circumferentially outside (to the right-hand side in FIG. 3) the groove 21 having a specific circumference. The grooves 23 include two side surfaces 23a, 23b. An outer circumferential side surface 23b of the grooves 23 is tapered having an angle of inclination Θ3b which is preferably 85°. Moreover, an inner circumferential side surface 23a of the grooves 23 is tapered having an angle of inclination Θ3a which is preferably 70°.

Furthermore, the two side surfaces 21a, 21b of the groove 21 having the specific circumference both have an angle of inclination Θ1a, Θ1b of 85°.

In the above-described manner, the outer circumferential side surface 22b of the groove 22 and the inner circumferential side surface 23a of the groove 23 have a taper of 70°. During the film formation of the recording film 13, particles 3 flying out from the sputtering target are easily adhered to the bottom portions 22d, 23d (groove portions) of the narrow width and deep depth grooves 22, 23.

Furthermore, a width WG of the groove portions 21d, 22d, 23d of the grooves 21–23 are each preferably 0.8 µm. Moreover, the width WL of the land portions 22c, 23c between the adjacent grooves 21–23 are also all preferably 0.8 µm. Moreover, the depth D of the grooves 21–23 is preferably 175 nm, which is a depth to avoid cross-erasure during land/groove recording.

In the manufacturing process of the substrate 11, the angles of inclination Θ2b, Θ3a of the grooves 22, 23 can be made a predetermined value (70°) using a well-known process in the original disk manufacturing process during the exposure of photoresist by adjusting the optical system of laser light used for exposure (well-known in original disk manufacturing process→stamper manufacturing process→replica manufacturing process).

Furthermore, in order to increase the track density, it is preferable that the angle of inclination Θ2a of the groove 22, the angle of inclination Θ3b of the groove 23, and the angles of inclination Θ1a, Θ1b of the groove 21 be 90°. However, the angles of inclination Θ2a, Θ3b, Θ1a, and Θ1b are generally about 85° during the normal manufacturing process of the substrate 11, and a taper is normally present even in these sites. Furthermore, by improving the exposure conditions of the photoresist, such as the optical system of the laser light used for exposure, and the like, the angles of inclination can be made close to 90°.

A description of the method of film formation of the recording film 13 on the substrate 11 of the optical disk 10 in accordance with embodiments of the present invention will now be provided below.

Firstly, the lower protective layer 12 is formed on the upper surface of the substrate 11, before film formation of the actual recording film 13 on the substrate 11. However, as shown in FIG. 1, grooves are formed in the upper surface of the lower protective layer 12, and the formation of the grooves 21–23 of the substrate 11 itself is about the same as the formation of grooves in the lower protective layer 12. Accordingly, to simplify the following description, film formation of the recording film 13 on the substrate 11will be described hereinbelow.

Figure 4:
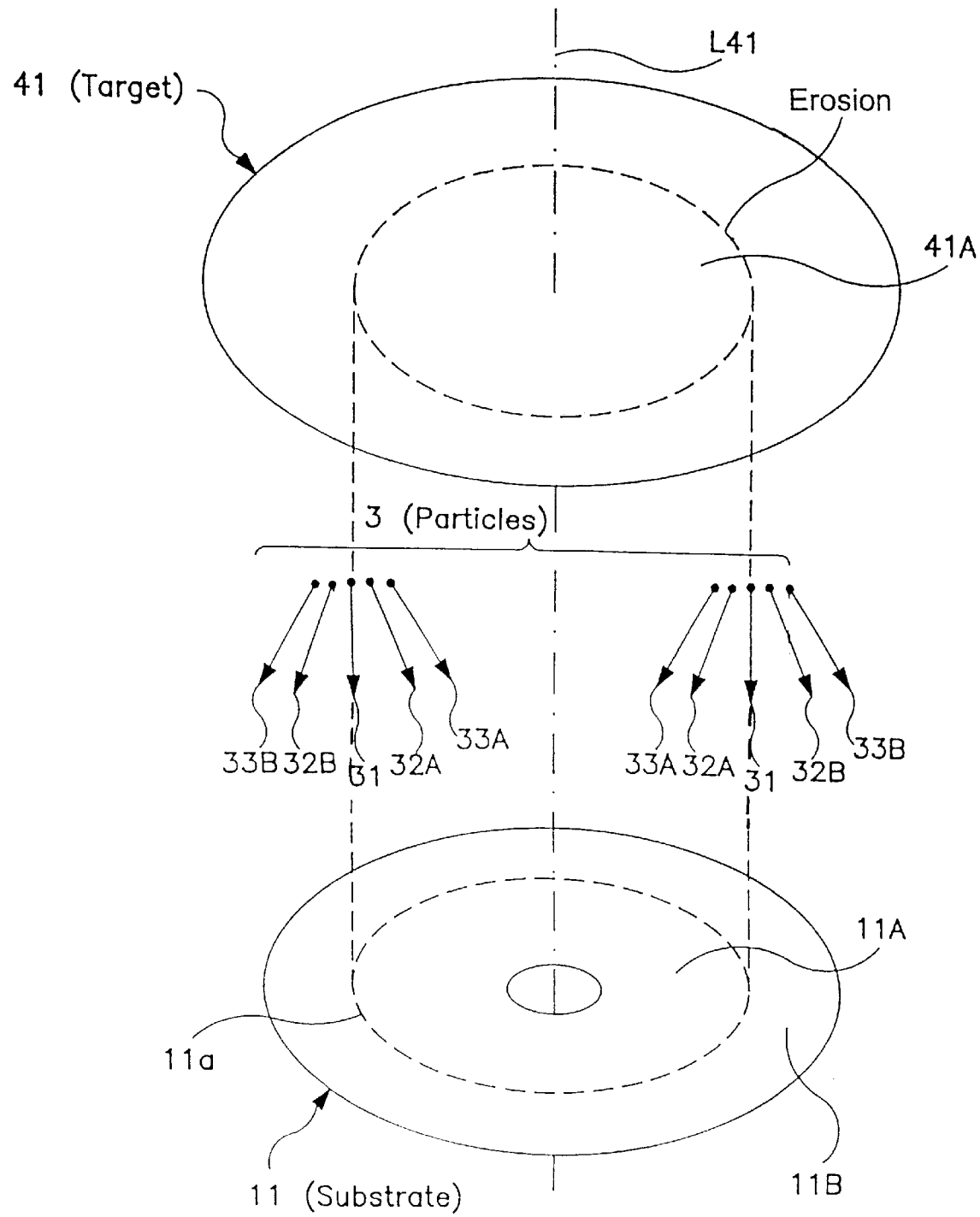
FIG. 4 is a diagram illustrating a method of film formation of a recording layer on the substrate of the optical disk in accordance with embodiments of the present invention.
Figure 5:
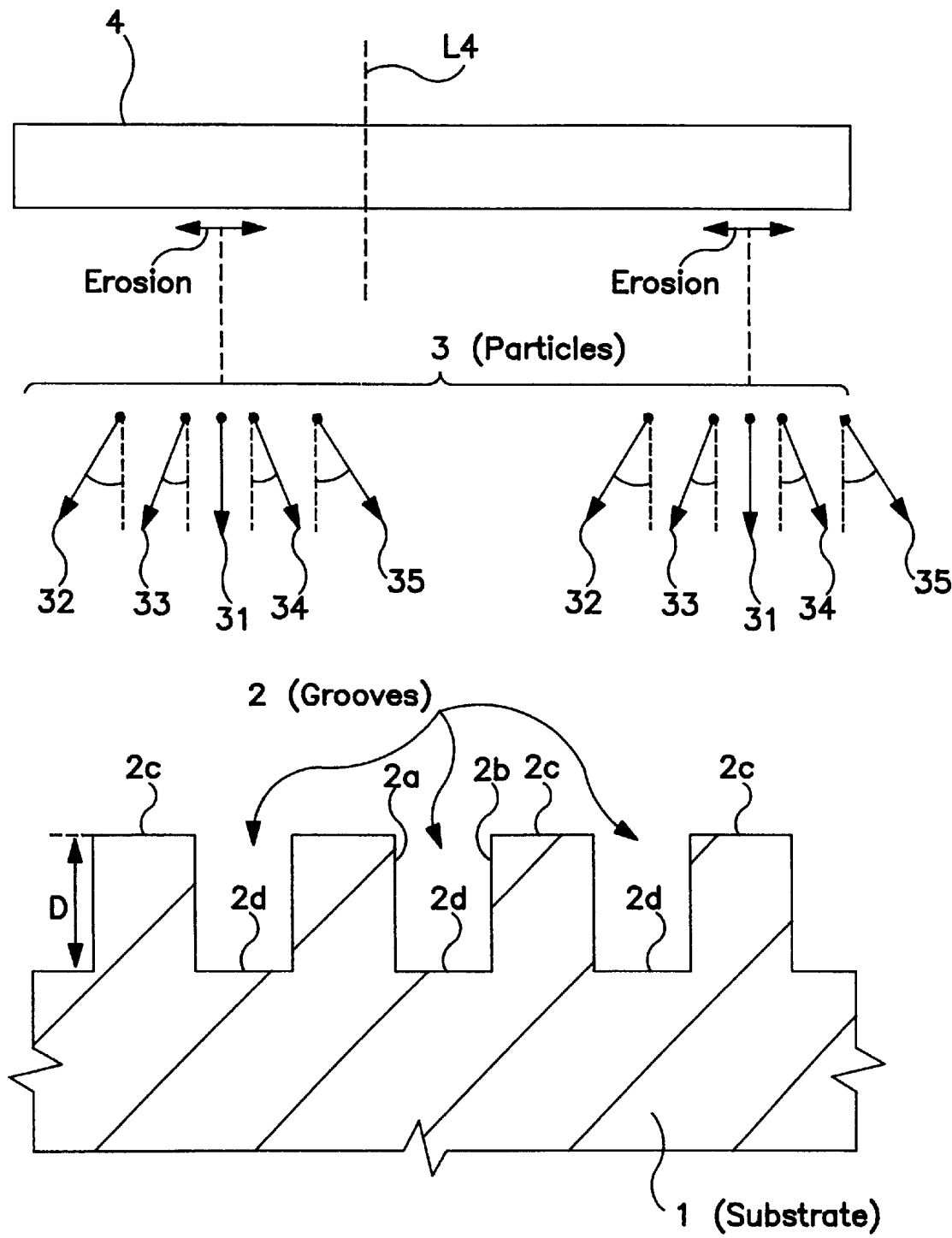
FIG. 5 is a cross-sectional diagram of a prior art optical disk.

As shown in FIG. 4, when forming the recording film 13 on the substrate 11 having the configuration shown in FIG. 3, the well known magnetron sputtering method is performed. In accordance with the magnetron sputtering method, the substrate 11 and a target 41 are located facing each other in the sputtering chamber (not shown in the drawing) such that an axis which passes through the center of the substrate 11 and an axis which passes through the center of the target 41 are the same. Furthermore, the gas pressure in the sputtering chamber is maintained at $5 \times 10^{-3}$ Torr in a state in which argon gas has been introduced.

The target 41 is preferably a TbFeCo alloy. The target 41, and the recording film 13 which is formed, preferably have a composition comprising Tb 21 atom %, Fe 63.2 atom %, and Co 15.8 atom % (atom percentages).

Moreover, as shown in FIG. 4, a magnet (not shown in the drawing) is located in the back surface side of the target 41. The magnet rotates eccentrically relative to the center axis L41 of the target 41 to increase the film forming speed.

The region in the target 41 where many particles are sputtered by rotation of the magnet is referred to as an erosion zone 41 A. The size of the erosion zone 41 A varies according to the ) size of the magnet, but is normally smaller than the size of the substrate 11 (diameter 86 mm). Furthermore, in accordance with preferred embodiments of the present invention, the target 41 is preferably a 6-inch target, and the diameter of the erosion zone 41A is preferably about 75 mm.

The substrate 11 is located facing the target 41 such that the axis passing through the center of the substrate 11 and the axis passing through the center of the target 41 are the same. A diameter having a specific circumference 11a of the substrate 11 is prepared to coincide with the diameter of the erosion zone 41A of the target 41.

When film formation is performed under such conditions, particles 3 fly out from the erosion zone 41A according to a cosine law. As shown in FIG. 4, the particles 3 fly out in a direction along a normal L41 to the target 41 in the direction represented by the arrow 31, or in various directions represented by the arrows 32A, 33A, 32B, 33B at inclinations with respect to the normal line L41.

Particles 3 flying out of the erosion zone 41A in the direction of the arrow 31 along the line L41 normal to the target 41 are incident about perpendicularly in a region 11 A facing the erosion zone 41A, which corresponds to the inside of the specific circumference 11a of the substrate 11.

In contrast, particles 3 which fly from the target 41 out in a direction of arrows 32A, 33A, 32A, 33B at an inclination to the line L41 normal to the target 41, are incident obliquely on the region 11A, and also on a region 11B which does not correspond to the erosion zone 41A, and corresponds to the outside of the specific circumference 11a.

The particles 3 which are incident obliquely on the region 11B are particles which fly out in a direction of the arrows 32B, 33B inclined outward of the erosion zone 41A from the line L41 normal to the target 41.

Moreover, as described above, the particles 3 which fly out in a direction of the arrows 32B, 33B, inclined outward of the erosion zone 41A, are incident on the region 11B. Similarly, particles flying out in the direction of arrows 32A, 33A, inclined inward of the erosion zone 41A from the line L41 normal to the target 41, frequently become incident on the region 11A.

In the above-described manner, when film formation is performed by sputtering, particles which go outward with respect to the line L41 normal to the target 41 in the direction of the arrows 32B, 33B are frequently incident on the region 11B. Particles which go inward with respect to the normal line L41 in the direction of the arrows 32A, 33A are comparatively frequently incident on the region 11A inside the specific circumference 11a. As shown in FIG. 3, the groove 21, corresponding to the specific circumference 11a, is a boundary between grooves 22, 23 having different cross-sectional shape which are formed corresponding to regions 11A, 11B, respectively.

Specifically, as shown in FIG. 3, in the region 11B of the substrate 11, the inside surface 23a of the inner circumferential side of the groove 23 is given a taper angle having an inclination Θ3a of 70° according to the directionality of the particles in the direction of the arrows 32B, 33B directed outward of the normal line L41.

Furthermore, in the region 11A of the substrate 11, the inside surface 22b of the outer circumferential side of the groove 22 is given a taper angle having an inclination Θ2b of 70° according to the directionality of the particles in the direction of the arrows 32A, 33A directed inward of the normal line L41.

When forming the recording film 13 on the substrate 11, with the substrate 11 facing the target 41 such that the axis through the center of the substrate 11 and the axis through the center of the target 41 are the same, the diameter at the location of the specific circumference 11a coincides with the diameter of the erosion zone 41A of the target 41.

Accordingly, as shown in FIG. 3, in the region 11B of the substrate 11 particles flying out outward of the erosion zone 41A from the normal line L41 of the target 41 in the direction of the arrows 32B, 33B are not screened by the land portions 23c, are incident along the taper of the side surface 23a of the inner circumferential side of the groove 23, and can reach the groove portion 23d of the deep groove 23. As a result, in the region 11B, the particles 3 which are incident from an oblique direction are deposited in equal proportions on both sides of the groove portion 23d and the land portion 23c of the deep groove 23.

Moreover, in the region 11A of the substrate target 11, particles which fly out inward of the erosion zone 41A from the normal line L41 of the target 41 in the direction of the arrows 32A, 33A are not screened by the land portion 22c of the groove 22, and are incident along the taper of the outer circumferential side surface 22b of the groove 22, and can reach the groove portion 22d of the deep groove 22. As a result, in the region 11A of the substrate 11, the particles 3 which are incident from oblique directions are deposited in equal proportions on both sides of the groove portion 22d and the land portion 22c of the deep groove 22.

Furthermore, as described above, in the region 11A, the particles 3 which fly out from the target 41 in a direction of the arrow 31 along the normal line L41 of the target 41 are incident about perpendicularly. The perpendicularly incident particles 3 deposit in equal proportions on both sides of the deep groove 22, reaching the groove portion 22d and the land portion 22c of the deep groove 22 in the same way.

Moreover, because the particles 3 which fly out in the direction of the arrow 31 along the normal line L41 of the target 41 are incident in the groove 21 having the specific circumference and are deposited in equal proportions on both sides of the deep groove 21, the particles 3 reach the deep groove portion 21d and the land portions 22c, 23c of the deep groove 21 in the same manner.

In the above-described manner, the recording film 13 can be formed equally in the groove portions 21d, 22d, 23d and the land portions 22c, 23c of the deep grooves 21–23. Furthermore, the sputtering of the particles 3 is preferably performed until the film thickness of the recording film 13 formed in the grooves 21–23 becomes 50 nm.

As described above, the lower protective layer 12 is already formed under the recording layer 13, and the upper protective layer 14 is formed on the recording layer 13. The lower protective layer 12 and upper protective layer 14 both comprise silicon nitride, and have respective film thicknesses of preferably 75 nm and 70 nm. The films of the lower protective layer 12 and upper protective layer 14 are formed by the well-known reactive sputtering method.

In accordance with the reactive sputtering method, a 6-inch sputtering target is used for the film formation of the lower protective layer 12, similarly to the film formation of the recording layer 13. The diameter of the erosion zone is made to coincide with the diameter of the specific circumference 11a of the substrate 11. Accordingly, silicon nitride films (lower protective layer 12) can be formed on the substrate 11 with equal film thickness in the groove portions 21d–23d and land portions 22c, 23c, with the grooves 22, 23 formed of different cross sectional shape with the groove 21 of the specific circumference 11a as the boundary.

Moreover, silicon nitride films (upper protective layer 14) can be formed on the recording layer 13 with equal film thickness in the groove portions 21d–23d and the land portions 22c, 23c in formation of the upper protective layer 14, with the shape of the grooves on the upper surface of the recording layer 13, because as shown in FIG. 1 the grooves (21–23) of the substrate itself are the same.

As described hereinabove, in accordance with embodiments of the present invention, the side surface 22b of the outer circumferential side of the groove 22 of the substrate 11, and the side surface 23a of the inner circumferential side of the groove 23, are given a taper according to the directionality of the particles 3 flying from the erosion zone 41A when the films 12, 14 or the recording film 13 is formed. Accordingly, when the diameter of the specific circumference 11a of the substrate 11 is coincident with the diameter of the erosion zone 41A, the particles 3 incident from oblique directions on the substrate 11 are not screened by the land portions 22c, 23c, and can reach the groove portions 22d, 23d of the deep grooves 22, 23.

In accordance with embodiments of the present invention, even thought the depth D of the grooves 21–23 of the optical disk 10 is deep to avoid cross-erasure in the land/groove recording, the recording film 13 can be formed such that the land portions 22c, 23c and the groove portions 22d, 23d have the same film thickness.

In accordance with embodiments of the present invention, because the film thickness of the recording film 13 is equal in the land portions 22c, 23c and the groove portions 22d, 23d, recording or erasure of information in the land portions 22c, 23c and groove portions 22d, 23d can be performed with laser light having the same power. As a result, the land/groove recording operation and the construction of the recording and playback device are simplified.

Moreover, in accordance with embodiments of the present invention, because the film thickness of the recording film 13 is equal in the land portions 22c, 23c and the groove portions 22d, 23d, at the time of recording or erasure of information at the groove portions 22d, 23d, there is no cross-erasure of the land portions 22c, 23c, and cross-erasure of the groove portions 22d, 23d can also be avoided when recording or erasing information at the land portions 22c, 23c.

In accordance with embodiments of the present invention, because the lower protective film 12 and the upper protective film 14 are formed having a film thickness which is equal in the land portions 22c, 23c and groove portions 22d, 23d, the recording sensitivity of the land portions 22c, 23c, and groove portions 22d, 23d are reliably constant.

Furthermore, in accordance with the embodiments of the present invention, because the respective angles of inclination Θ2a, Θ3b, Θ1a, Θ1b of the side surface 22a of the inner circumferential side of groove 22, the side surface 23b of the outer circumferential side of groove 23, and the two side surfaces 21a, 21b of the groove 21 are about perpendicular (85°), the track density can be increased.

Furthermore, in accordance with the embodiments of the present invention, the angles of inclination Θ2b, Θ3a of the respective side surfaces 22b, 23a of the grooves 22, 23 are both made 70°. However, the angles of inclination Θ2b, Θ3a may be set at different angles. For example, the angles of inclination θ2b, θ3a can be set to optional values within the range greater than 45° and smaller than 80°. If the angles of inclination Θ2b, Θ3a are at values within a range greater than 45° and smaller than 80°, the particles 3 which fly out in a direction inclined to the normal line L41 of the target 41 are incident along the taper of the side surfaces 22b, 23a of one side of the grooves 22, 23, and can reach the groove portions 22d, 23d.

Furthermore, in accordance with the embodiments of the present invention, a 6-inch target is used and the diameter of the erosion zone 41A is preferably about 75 mm, and the specific circumference 11a of the substrate 11 is preferably set to a diameter of 75 mm. However, the diameter of the specific circumference is not limited to this value and, for example, for a 5-inch target having an erosion zone of about 63 mm, the specific circumference 11a may be set at 63

Moreover, in accordance with the embodiments of the present invention, the specific circumference 11a is formed of one groove 21 which corresponds to the outer form of the erosion zone 41A. However, when the outer form of the erosion zone 41A is not clear, the specific circumference 11a may be set to a specific width. When the specific circumference 11a is set to a specific width, a plurality grooves 21 may be formed at the set width of the specific circumference 11a.

Moreover, in accordance with the embodiments of the present invention, the substrate 11 has been described as including one specific circumference 11a. However, the substrate 11 may include a plurality of specific circumferences 11a. When the substrate 11 includes a plurality of specific circumferences 11a, grooves 22 and 23 having mutually different cross-sectional shape may be formed between the specific circumferences 11a.

Furthermore, in accordance with the embodiments of the present invention, the angles of inclination Θ2a, Θ3b, Θ1a, Θ1b of the respective side surfaces 22a, 23b, 21a, 21b, are close to a right angle (85°) to increase the track density. However, the angles of inclination (Θ2a, Θ3b, Θ1a, Θ1b of the respective side surfaces 22a, 23b, 21a, 21b may be angles greater than 90° (for example, 100°–110°). By increasing the angles of inclination to greater than 90°, particles obliquely incident on the substrate 11 can also adhere to the corner portions of the groove portions. As a result, the regions of the groove portions in which recording is not reliable become small, and the advantage of further increased the track density is achieved.

Moreover, in accordance with the embodiments of the present invention, the depth D of the grooves is preferably 175 μm. However, the groove depth D in the optical disk 10 may be in the range of 80 nm–600 μm. Similarly, film formation of the recording film can be with equal film thickness in the land portions and groove portions, and cross-erasure can be reliably avoided.

Furthermore, in accordance with the embodiments of the present invention, the width WL of the land portions, and the width WG of the groove portions, are both preferably 0.8 μm. However, the width of the land portions and the width of the groove portions are not limited to this value. Moreover, the widths WL, WG may mutually differ. When the widths WL, WG differ, if the widths WL, WG are in the range 0.5 μm–1.0 μm, the recording film can be formed with equal film thickness in the land portions and groove portions, and cross-erasure can be reliably avoided.

Moreover, in accordance with the embodiments of the present invention, the formation of the recording film is performed with a magnetic material. However, the recording film may be formed with a phase change medium. The phase change medium may comprise GdSbTe, InSbTe, AgInSbTe and the like materials. Moreover, the protective films comprise $SiO_2$, $Al_2O_3$, $GeO_2$, $In_2O_3$, ZnS and the like materials or their combinations. When the recording film is formed with a phase change medium, because the film thickness is constant in the land portions and groove portions, cross-erasure is avoided and an increased density of information can be designed.

Furthermore, in accordance with the embodiments of the present invention, the optical disk 10 comprises a polycarbonate substrate. However, the optical disk substrate may be a glass 2P substrate.

Moreover, in accordance with the embodiments of the present invention, the land/groove recording method is used. However, a groove recording method can also be used.

As described hereinabove, in accordance with the embodiments of the present invention, because a recording film can be formed having equal thickness in the land portions and groove portions, regardless of the depth of the grooves of the substrate, a recording medium is advantageously provided in which information can be recorded in the recording film without problems caused by cross-erasure.

Moreover, in accordance with the embodiments of the present invention, by making the diameter of a specific circumference of the substrate coincide with the diameter of the erosion zone of the target, the films can be formed with equal film thickness of the recording film in the land portions and the groove portions of the substrate.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An optical disk, comprising:
   a plastic substrate having a circular shape; and
   a recording film on which information is recorded formed on the plastic substrate,
   wherein the plastic substrate includes a groove formed in a concentric circular shape or spiral shape, the groove having at least a bottom surface, an inner side surface, and an outer side surface, at least one of the side surfaces of the groove having a taper in the direction of the bottom surface, a supplementary angle of the angle created by the inner side surface and the bottom surface being a first angle of inclination, a supplementary angle of the angle created by the outer side surface and the bottom surface being a second angle of inclination, and said first angle of inclination being smaller than said second angle of inclination, and wherein the depth of the groove is in a range of 80 nm–600 nm.

2. An optical disk as recited in claim 1, wherein information is recorded on the optical disk by a land/groove recording method.

3. An optical disk as recited in claim 1, wherein the recording film comprises a phase change medium.

4. An optical disk as recited in claim 2, wherein the recording film comprises a phase change medium.

5. An optical disk as recited in claim 1, wherein the first angle of inclination is greater than 45° and less than 80°, and the second angle of inclination is 85°.

6. An optical disk as recited in claim 1, wherein the second angle of inclination minus the first angle of inclination is greater than 5°.

7. An optical disk as recited in claim 1, wherein the depth of the groove is within a range of 175 nm–600 nm.

8. A plastic substrate of an optical disk, the substrate comprising:

a groove formed in a concentric circular shape or spiral shape, the groove having at least a bottom surface, an inner side surface, and an outer side surface, at least one of the side surfaces of the groove having a taper in the direction of the bottom surface, a supplementary angle of the angle created by the inner side surface and the bottom surface being a first angle of inclination, a supplementary angle of the angle created by the outer side surface and the bottom surface being a second angle of inclination, and said first angle of inclination being smaller than said second angle of inclination, and wherein the depth of the groove is in a range of 80 nm–600 nm.

\* \* \* \* \*

UNITED STATES PATENT AND TRADEMARK OFFICE
CERTIFICATE OF CORRECTION

PATENT NO.: 6,108,297
DATED : August 22, 2000
INVENTOR(S): Teruyuki Ohta, et al.

It is certified that error appears in the above-identified patent and that said Letters Patent is hereby corrected as shown below:

Title Page, [56] References Cited, FOREIGN PATENT DOCUMENTS please ADD

--1-279437   11/1989   Japan--; and
--1-315044   12/1989   Japan--.

Signed and Sealed this

Twenty-fourth Day of April, 2001

Attest:

NICHOLAS P. GODICI

Attesting Officer      Acting Director of the United States Patent and Trademark Office